(No Model.)

C. J. APPLEQUIST.
ANTI-FRICTION HUB.

No. 421,539. Patented Feb. 18, 1890.

Witnesses.
J. Jessen
B. Booth

Inventor.
Charles J. Applequist
By Paul & Munun Att'ys

UNITED STATES PATENT OFFICE.

CHARLES J. APPLEQUIST, OF ELLENDALE, (DAKOTA TERRITORY,) NORTH DAKOTA.

ANTI-FRICTION HUB.

SPECIFICATION forming part of Letters Patent No. 421,539, dated February 18, 1890.

Application filed June 27, 1889. Serial No. 315,812. (No model.)

*To all whom it may concern:*

Be it known that I, CHARLES J. APPLEQUIST residing at Ellendale, in the county of Dickey and Territory of Dakota, have invented certain new and useful Improvements in Anti-Friction Hubs, of which the following is a specification.

My invention relates to hubs for wheels, particularly of farm implements and plow-colters, its object being to provide a simple durable hub, which will be easy of operation and require no oiling; and it consists, generally, in the construction and combination hereinafter described, and particularly pointed out in the claims. I accomplish this by providing friction-rolls inclosed in the hub-box between it and the axle, whereby contact between the box and axle is prevented and friction largely avoided and no lubricator is required, since there are no friction-bearings. The parts are at the same time tightly inclosed, so as to prevent dirt from working into the interior of the hub.

Figure 1:
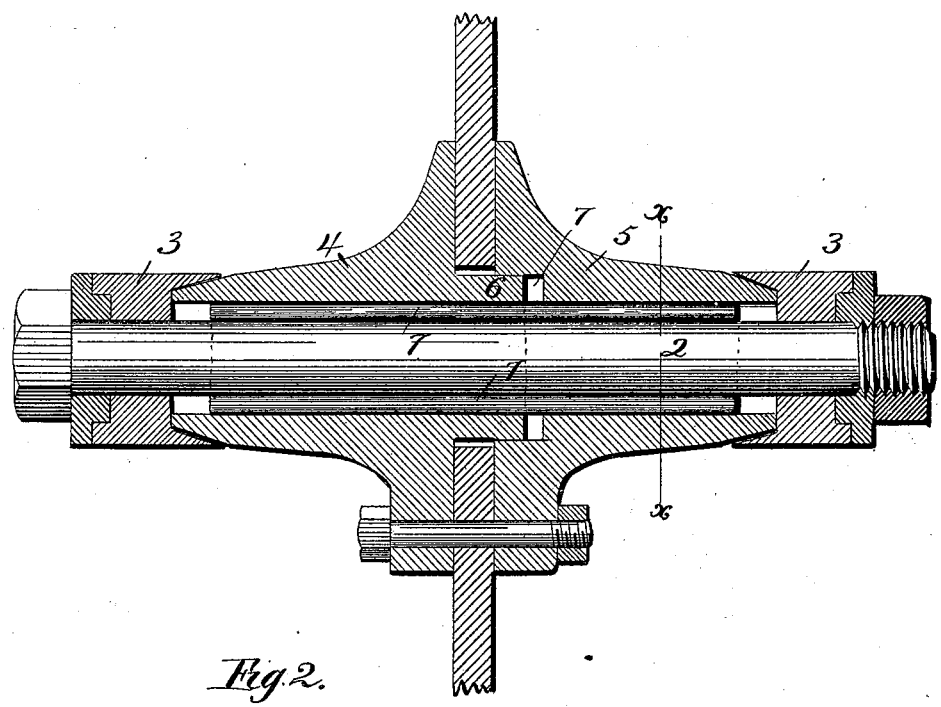
Figure 2:
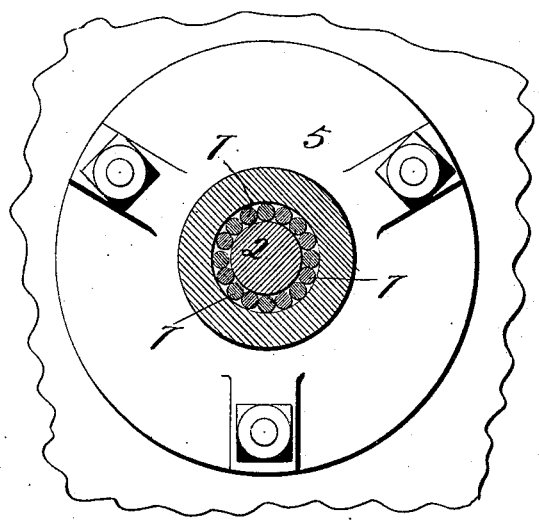

In the accompanying drawings, forming a part of this specification, Figure 1 is a central longitudinal section of my improvement. Fig. 2 is a cross-section on line $x$ $x$ of Fig. 1.

In the drawings, 2 represents the hub-bolt, which serves as its axle; 3, the socketed nuts at each end, fitting closely to the bolt and inclosing the end of the hub and serving as a shoulder or stop to hold the friction-rolls in place. The hub is preferably made of the two parts or members 4 and 5, 4 having a centrally-projecting annular spur or ring 6, fitting into a corresponding socket 7 of the part 5. The members 4 and 5 embrace the colter or wheel spokes between their inner faces, which are secured together by bolts or in any other suitable manner. These members 4 and 5 are preferably iron and have a cylindrical longitudinal opening through their center, which forms the hub-box. Arranged loosely in the box around the bolt or axle and longitudinally therewith are a series of friction-rolls 7, which are turned by the rotation of the hub and roll upon the axle. By this means there is no friction requiring lubricating, and the close-fitting nuts and the manner of joining the parts of the hub together prevent dust or other foreign substance working into the hub-box.

In operation, in whichever direction the hub is turned, the friction-rolls travel around the axle in the same direction, rolling upon the inner wall of said box and the surface of the axle.

I claim as my invention—

1. The combination, with an axle, of a series of friction-rolls arranged around and parallel with the same, a hub inclosing said rolls and composed of two parts rigidly secured together and embracing and holding between them the disks or spokes of the wheel, and socketed nuts fitted over the ends of the hub and inclosing the ends of said friction-rolls, substantially as and for the purposes set forth.

2. In a hub, the combination, with the two members 4 and 5, adapted to be rigidly secured together and having a cylindrical hollow center forming the hub-box, of a series of friction-rolls arranged in said box longitudinal thereof and adapted to bear upon the axles, and socketed nuts embracing the ends of the hub and forming ends to said box, substantially as described.

In testimony whereof I have hereunto set my hand this 8th day of June, 1889.

CHARLES J. APPLEQUIST.

In presence of—
 JOHN H. BOYLE,
 A. J. APPLEQUIST.